United States Patent [19]

Patterson

[11] 4,056,028
[45] Nov. 1, 1977

[54] APPARATUS FOR GUIDING A PORTABLE POWER-SAW

[76] Inventor: G. Keith Patterson, 322 Boler Road, London, Ontario, Canada, N6K 2K2

[21] Appl. No.: 685,893

[22] Filed: May 12, 1976

[30] Foreign Application Priority Data

June 4, 1975 Canada .................................. 228471

[51] Int. Cl.$^2$ ............................................. B27B 9/04
[52] U.S. Cl. ...................................... 83/745; 83/574; 83/455
[58] Field of Search .................. 83/745, 522, 574, 455

[56] References Cited

U.S. PATENT DOCUMENTS

| 2,773,523 | 12/1956 | Hopla | 83/745 |
| 3,320,982 | 5/1967 | Kwiatkowski | 83/574 |
| 3,380,492 | 4/1968 | Konopka | 83/471.2 |
| 3,830,130 | 8/1974 | Moore | 83/745 |

*Primary Examiner*—Willie G. Abercrombie
*Attorney, Agent, or Firm*—Oltsch & Knoblock

[57] ABSTRACT

The invention provides a method of guiding a portable power-saw across a workpiece being sawn. Apparatus for use in this method comprises a guide member which has a substantially flat surface which may be placed on the flat surface of the workpiece. The guide member has a straight edge and located on the flat surface of the guide member is a rod-holder which is orientated at a right angle or any other desired angle to the straight edge. A rod of material such as wood or plastic is inserted in the rod holder so that the rod extends therefrom for a few inches. The power-saw is then run along the straight edge of the guide member, with the sole plate of the saw maintained in snug contact therewith, until the rod is severed. Then the distance from the severed end of the rod to the straight edge is exactly the same as the distance between the sole plate edge and the saw blade. The guide member is then transferred to the workpiece and the rod end is aligned with the line of cut to be made, with the straight edge of the guide member parallel thereto. By moving the saw across the workpiece — with the guide member positioned as above and with the sole plate of the saw maintained in contact with the straight edge of the guide member — the saw will automatically follow the line of cut. This technique eliminates the unstable method of guiding the saw solely by hand and also obviates the need for relatively unstable or complex devices as have been previously used for the present purpose.

14 Claims, 8 Drawing Figures

APPARATUS FOR GUIDING A PORTABLE POWER-SAW

This invention relates to a method of guiding a portable power-saw along the surface of a workpiece being sawn and to an apparatus for use in such a method.

Portable power-saws generally fall into two common types, i.e. reciprocating saws and circular saws. Features which are common to both types of saw are that they have a handle by which they may be guided across the workpiece and a sole plate which normally rests upon the workpiece surface as the saw is guided thereacross. A difficulty commonly encountered in using these saws is that unless it is guided in some manner, the sole plate is free to slide randomly upon the surface of the workpiece and the saw must therefore be maintained in the proper alignment for the desired cut by means of the handle alone. In practice, this is very difficult to accomplish, particularly if the saw cut is to follow a straight line. For this reason, it is common practice to lay down a straight edge — for example, a length of wood — upon the surface of a workpiece and to space it from the line to be cut so that the edge of the sole plate of the saw slides along the straight edge, thus guiding the saw in a straight line. This technique, however, has various drawbacks, one of which is the difficulty of gauging how far away from the line to be cut the straight edge should be placed to ensure that the blade accurately follows the line. Various techniques and apparatus have been proposed which overcome the foregoing drawback with varying degrees of success, but the more successful of these tend to be relatively complex, whilst the simplest techniques proposed generally do not provide the accuracy and consistency of cut which is often required by the user.

An object of the present invention is to provide a method and apparatus for guiding a portable power-saw, which method and apparatus are simple and effective in use.

Thus according to the present invention there is provided a method of guiding a portable power-saw having a sole plate which travels along the surface of a workpiece being sawn, said method comprising the steps of providing an apparatus comprising a guide member having a substantially flat surface and a straight saw-guiding edge and a rod-holding member located on said flat surface of said guide member, securing within said rod-holding member a rod formed from a material which is capable of being severed by said power-saw, said rod-holding member being so positioned that said rod extends from said saw-guiding edge of said member at a selected angle thereto, moving said saw towards said rod with an edge of said sole plate maintained in contact with said saw-guiding edge to sever said rod and expose a severed end thereof, placing the flat surface of said quide member upon a surface of the workpiece to be sawn and holding said rod closely adjacent and parallel with or flush against an edge of said workpiece with the severed end of said rod in alignment with a line along which the workpiece is desired to be sawn, and sawing said workpiece by moving said saw thereacross with said edge of said sole plate maintained in contact with said saw-guiding edge of said guide member.

According to a further aspect of the invention, there is provided apparatus for guiding a portable power-saw during sawing of a workpiece, said apparatus comprising a guide member having at least one surface and a straight saw-guiding edge adapted for placement upon said workpiece and a holder located on said flat surface of said guide member for securely supporting and holding a rod to extend from said saw-guiding edge of said member at a selected angle thereto, said rod formed from a material which is capable of being severed by a portable power-saw and said holder being structured to permit said rod to be placed closely adjacent and parallel with or flush against an edge of said workpiece to be sawn with the saw-guiding edge of said guide member overlying said workpiece member.

The invention will now be described further, by way of example only and with reference to the accompanying drawings, wherein.

Figure 1:
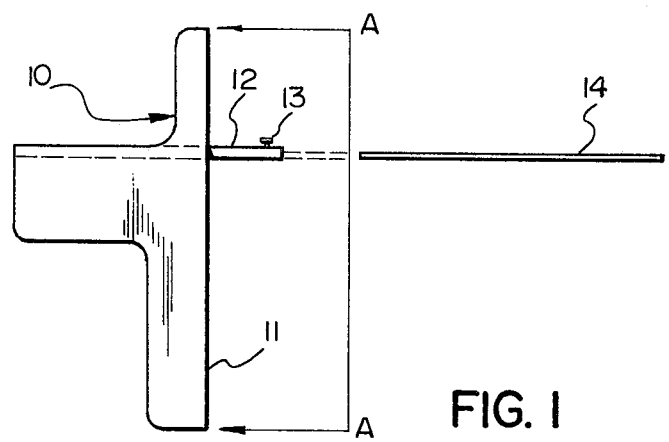
FIG. 1 is a plan view of apparatus according to one embodiment of the invention.
Figure 5:
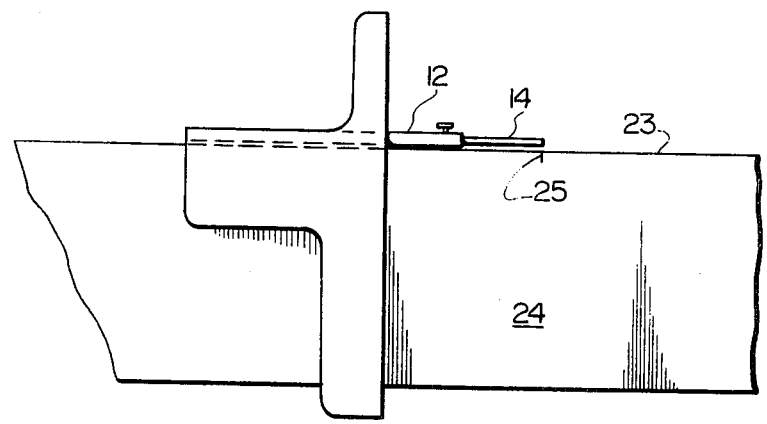
Figure 6:
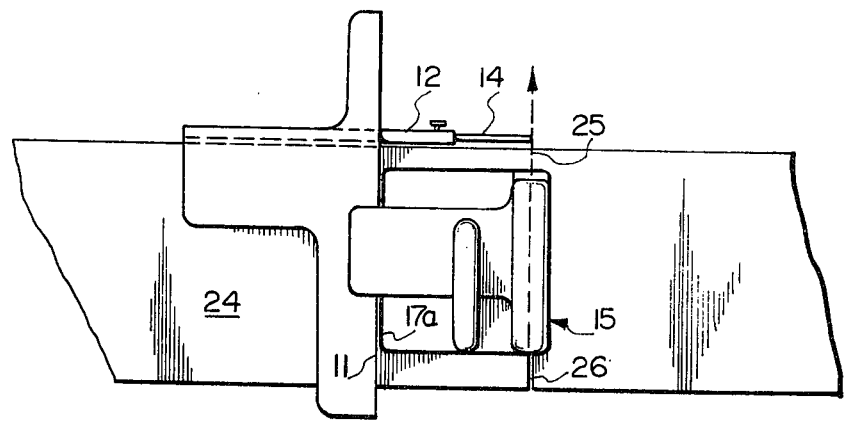
Figure 7:
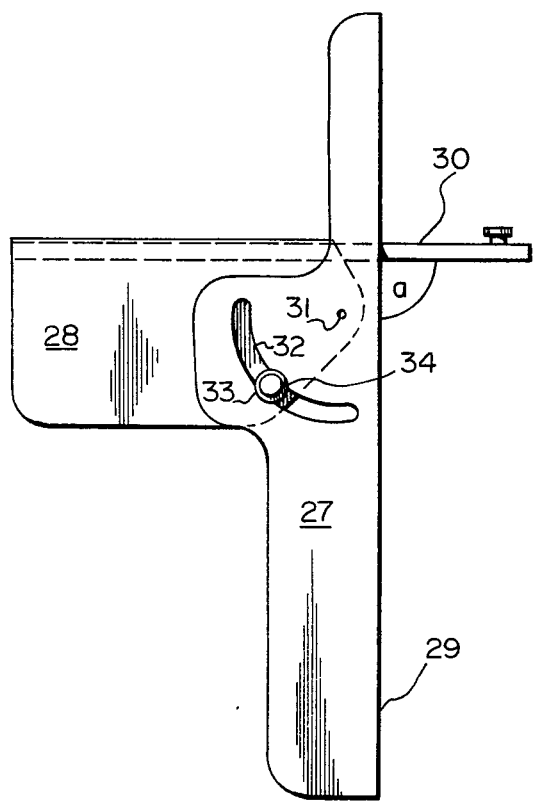
Figure 8:
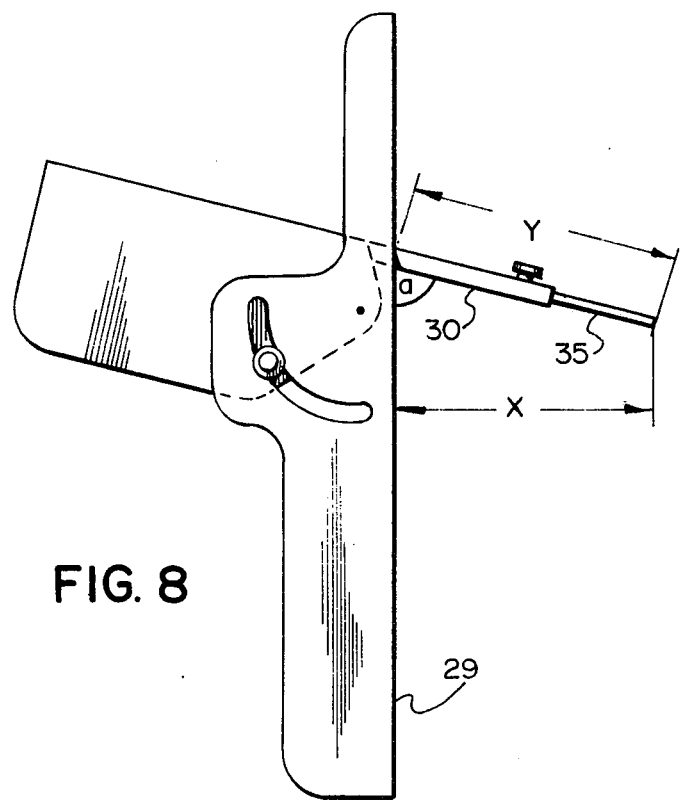

FIGS. 3 to 6, inclusive, show steps in the use of the apparatus of FIG. 1 in the sequence according to one embodiment of the method aspect of the invention; and FIGS. 7 and 8 are plan views of apparatus according to an alternative embodiment of the invention.

Figure 2:
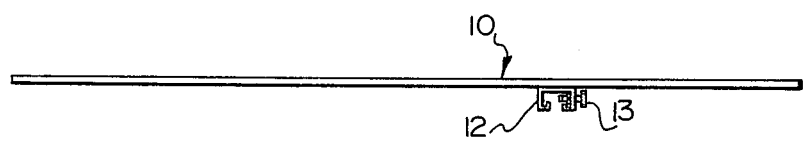
FIG. 2 is a side elevation along the line A—A of FIG. 1.

Referring to the drawings, and particularly to FIG. 1, the apparatus according to one embodiment of the invention comprises a flat member 10 of generally T-shape in plan view. The member is provided with a long straight edge 11, from which extends, at a right angle thereto, a rod-holding member 12. The member 12 may be in the form of a tube or — as in the present example — a channelled member, as may be seen in FIG. 2. The member 12 is provided with a threaded bolt 13, which passes through one wall thereof and which may be screwed down to clamp a rod securely within the member 11.

Figure 3:
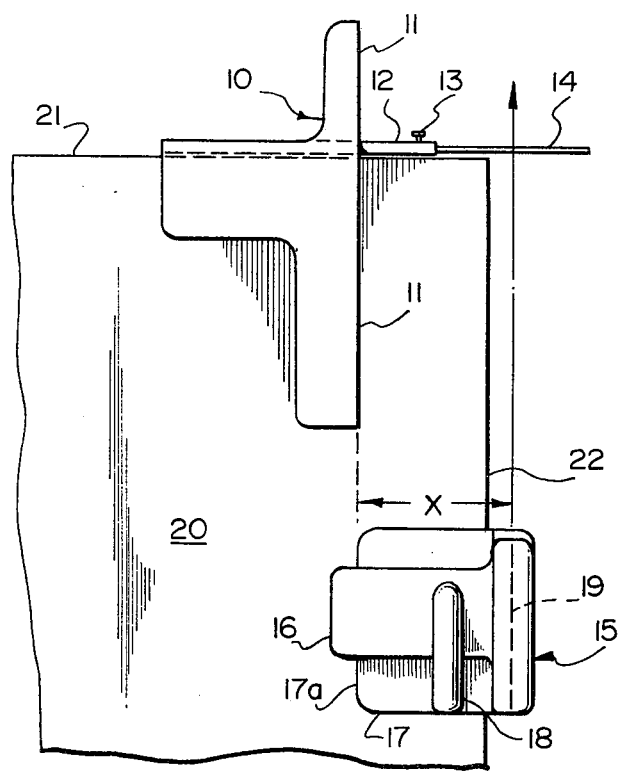
Figure 4:
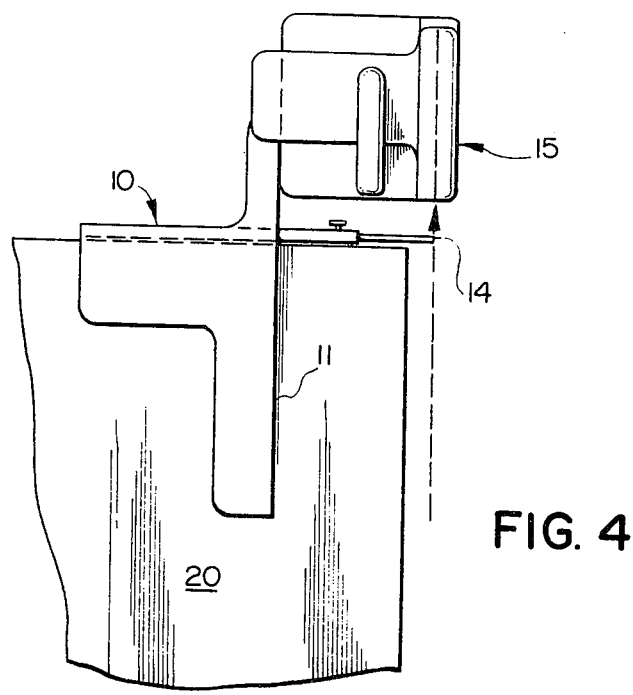

The operation of the apparatus is as follows. A rod 14 (See FIG. 1) of wood or plastic — although any material capable of being severed by a power saw may be utilized — is firstly selected for insertion in the rod-holding member 12. The rod — which may conveniently be referred to as the "gauging rod" — is preferably selected to be of such a cross-sectional configuration that it may be clamped firmly within the rod-holding member 12, by means of the clamping nut 13, without tendency to lateral movement therein. For example, if the member 12 is in the form of a channel member — as in the present example — then the rod is most suitably of rectangular cross-section with dimensions appropriate to those of the channel. Alternatively, if the holder is in the form of a cylindrical tube, then the rod is most suitably of circular cross-section and of slightly less diameter than the inside diameter of the tube. Furthermore, the rod may be serrated and secured within the rod holder by means of a spring clamp arrangement, rather than a screw clamp. The length of the gauging rod is selected to be such that when the rod is fully inserted into the holder, the free end thereof extends from the straight edge 11 by a distance greater than the distance X in FIG. 3. The precise significance of the distance X will be explained hereinafter, with reference to the description of the portable power saw employed in this example. Referring to FIG. 3, the saw 15 is shown in schematic form and generally comprises a motor 16, a sole plate 17, a handle 18 and a blade 19. For purposes of illustration only, the saw shown in FIGS. 3 to 6 is of the circular type, and the distance X, referred to above, is the perpendicular distance between the edge 11 and the saw blade 19.

After insertion of the rod 14 into the holder 12, the flat member 10 is placed upon one corner of a flat surface 20 (for example, a table or bench) having sides 21 and 22. The holder 12 is placed flush against the side 21 and the member 10 is moved sufficiently inwardly from the edge 22 to provide room for the saw 15 to be moved along the edge 11 with the blade 19 located outwardly of the side 22. The member 10 is securely held in this position whilst the saw is moved along and in contact with the edge 11 to sever the rod 14 (see FIG. 4). Clearly, the end of the rod 14 will now be located at the precise distance X from the straight edge 11 of the member 10.

To utilize the gauge, when "dressed" as above, the member 10 is transferred to the workpiece to be sawn. Thus, referring to FIGS. 5 and 6, the point at which a cut is to be made is marked at one edge 23 of the workpiece 24. The mark is designated 25 in FIGS. 5 and 6. The member 10 is then placed over the workpiece with the holder 12 flush against the edge 23 and the severed end of the rod 14 in alignment with the mark 25. Then, whilst the member 10 is held firmly in position upon the workpiece, the saw 15 is guided across the workpiece to effect the desired cut 26, with the sole-plate edge 17(a) maintained in contact with the straight edge 11. Since the end of the rod 14 is in alignment with the mark 25, the saw cut will also be aligned therewith and parallel to the straight edge 11.

It will be appreciated that the invention is by no means restricted to the situation wherein a 90° cut is to be made. Indeed, any desired angle of cut may be made by providing the rod holder at the appropriate angle with respect to the edge 11. Thus it may be convenient to market the device of the invention in sets, with the rod holder of each device in the set oriented at a specific angle. Such a set might typically cover angles of 90°, 60°, 45° and 30° — these being the angles of cut most commonly required.

FIG. 7 illustrates a particularly versatile embodiment of the device wherein the angle of cut may be adjustably set at any value up to 90°. The device is basically formed from two flat sections 27 and 28. Section 27 contains the straight edge 29 (which is analogous to the edge 11 in the embodiment of FIG. 1) and section 28 has the rod holder 30 (analogous to the rod holder 12 of FIG. 1) affixed to the bottom surface thereof. The sections 27 and 28 are rotatably secured together by means of a pivot pin 31, thus allowing the angle "a" between the rod holder 30 and edge 29 to be varied through 90°. The section 27 is provided with a quadrant-shaped slot 32, and a threaded shaft 33 is attached to the section 28 and extends upwardly through the slot 32. The shaft 33 is provided with a thumbscrew 34 which is threadedly engaged therewith and which may be screwed down to firmly clamp the underlying section 27 against the section 28. The quadrant is provided with an angular scale (not shown in the drawing) against which the angle "a" may be adjusted and firmly clamped at the desired value by means of the thumbscrew 34.

In use, the device of FIG. 7 is firstly adjusted as described above to the desired angle of cut. The rod extending from the holder 30 (not shown in FIG. 7) is then severed to conform to the saw width in analogous meanner to that described in connection with FIGS. 2 to 4, inclusive. Thus, referring to FIG. 8, it will be seen that the perpendicular distance from the edge 29 to the tip of the rod 35 will be X — i.e., the width of the soleplate of the saw. By simple geometry, it will further be appreciated that the distance Y — i.e. the combined length of the holder 30 and rod 35 extending from the edge 29 — will be X· Cosecant a.

To form the desired cut, the device is simply placed upon the workpiece, with the rod holder flush against the edge thereof — as in FIGS. 5 and 6 — and the end of the rod aligned with the mark to which the cut is to be made. The saw is then guided by the edge 29 precisely the same manner as described in connection with FIG. 6, to form the required cut.

In any of the forms of the device herein described, it is preferable to provide some means for preventing slippage of the device upon the workpiece as the saw cut is being made. This may be achieved in various ways, including the use of clamps to hold the device upon the workpiece or cleats upon the lower surface of the device. However, I have found that an effective way of preventing slippage without the need for clamps or cleats is simply to provide the lower surface of the device with a friction material such as rubber, which will grip the workpiece when downward pressure is applied to the device, without causing damage to the workpiece surface.

Thus, I have provided a method of guiding a portable power-saw to provide accurate and straight cuts, utilizing apparatus which is both inexpensive and durable due to its extremely simply construction.

What is claimed is:

1. Apparatus for guiding a portable power-saw during sawing of a workpiece, said apparatus comprising a guide member having at least one flat surface and a straight saw-guiding edge adapted for placement upon said workpiece and a rod-holding member located on said flat surface of said guide member, said rod-holding member provided with releasable clamping means for securely supporting and holding a rod to extend from said saw-guiding edge of said guide member at a selected angle thereto, said rod formed from a material which is capable of being severed by a portable power-saw and said holder being structured to permit said rod to be placed closely adjacent and parallel with or flush against an edge of said workpiece to be sawn with the saw-guiding edge of said guide member overlying said workpiece member.

2. Apparatus as claimed in claim 1, wherein said rod-holding member is in the form of an elongated open channel member provided with clamping bolt means threadedly engaged therewith, said rod being insertable longitudinally within said channel member to be secured therein by tightening down of said clamping bolt means.

3. Apparatus as claimed in claim 1, wherein said rod-holding member is fixedly located upon said flat surface and oriented with respect to said saw-guiding edge at a predetermined fixed angle.

4. Apparatus as claimed in claim 2, wherein said rod-holding member is fixedly located upon said flat surface and oriented with respect to said saw-guiding edge at a predetermined fixed angle.

5. Apparatus as claimed in claim 2, wherein said straight saw-guiding edge is coextensive with said flat surface upon which said rod-holding member is located.

6. Apparatus as claimed in claim 1, wherein said guide member is constructed as first and second flat members which are pivotally and slidably interconnected about an axis passing perpendicularly therethrough, said rod-holding member fixedly located upon a first flat surface of said first flat member remote from said second flat member, and said straight saw-guiding edge is provided on said second flat member.

7. Apparatus as claimed in claim 6, wherein co-operable locking means are provided between said first and second members to rigidly locate the relative orientation of said members at a desired angle.

8. Apparatus as claimed in claim 7, wherein said second flat member is provided with an arcuate slot centered upon the pivot between said first and second members, said first flat member is provided with a threaded shaft extending perpendicularly therefrom and passing through said arcuate slot, and said locking means comprises a clamping nut means provided in threaded engagement with said shaft, above said second flat member, adapted to be screwed down into abutment with said second flat member to rigidly clamp said flat members together.

9. Apparatus as claimed in claim 1, wherein friction material is provided upon at least part of said flat surface to frictionally engage a workpiece upon which said flat member is placed and inhibit relative sliding movement between said member and said workpiece.

10. Apparatus as claimed in claim 2, wherein friction material is provided upon at least part of said flat surface to frictionally engage a workpiece upon which said flat member is placed and inhibit relative sliding movement between said member and said workpiece.

11. Apparatus as claimed in claim 5, wherein friction material is provided upon at least part of said flat surface to frictionally engage a workpiece upon which said flat member is placed and inhibit relative sliding movement between said member and said workpiece.

12. Apparatus as claimed in claim 6, wherein friction material is provided upon at least part of said first flat surface of said first flat member to frictionally engage a workpiece upon which said first flat member is placed and inhibit relative sliding movement between said member and said workpiece.

13. Apparatus as claimed in claim 7, wherein friction material is provided upon at least part of said first flat surface of said first flat member to frictionally engage a workpiece upon which said first flat member is placed and inhibit relative sliding movement between said member and said workpiece.

14. Apparatus as claimed in claim 8, wherein friction material is provided upon at least part of said first flat surface of said first flat member to frictionally engage a workpiece upon which said first flat member is placed and inhibit relative sliding movement between said member and said workpiece.

* * * * *